(12) United States Patent
Guo (10) Patent No.: US 12,133,482 B2
(45) Date of Patent: Nov. 5, 2024

(54) TRIMMER HEAD AND STRING TRIMMER

(71) Applicant: Nanjing Chervon Industry Co., Ltd., Nanjing (CN)

(72) Inventor: Jianpeng Guo, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 62 days.

(21) Appl. No.: 17/017,208

(22) Filed: Sep. 10, 2020

(65) Prior Publication Data

US 2021/0076564 A1 Mar. 18, 2021

(30) Foreign Application Priority Data

Sep. 17, 2019 (CN) .......................... 201910877763.7
Sep. 17, 2019 (CN) .......................... 201921550134.5
Sep. 17, 2019 (CN) .......................... 201921550166.5

(51) Int. Cl.
*A01D 34/416* (2006.01)

(52) U.S. Cl.
CPC ....... *A01D 34/416* (2013.01); *A01D 34/4165* (2013.01)

(58) Field of Classification Search
CPC ................ A01D 34/412; A01D 34/416; A01D 34/4161; A01D 34/4162; A01D 34/4163; A01D 34/4165; A01D 34/4166; A01D 34/4176; A01D 34/4168; A01D 34/84; A01D 34/90; A01G 3/062; A01G 3/053
USPC ................................................... 30/276, 347
See application file for complete search history.

(56) References Cited

U.S. PATENT DOCUMENTS

| | | | |
|---|---|---|---|
| 6,952,877 B2* | 10/2005 | Pfaltzgraff | A01D 34/4163 30/276 |
| 8,025,249 B2* | 9/2011 | Alliss | A01D 34/4165 30/276 |
| 8,266,805 B1* | 9/2012 | Alliss | A01D 34/4163 30/276 |
| 10,251,338 B2* | 4/2019 | Zenkus | B29C 45/0046 |
| 10,537,057 B2* | 1/2020 | Sergyeyenko | A01D 34/4166 |
| 11,089,725 B2* | 8/2021 | Nie | A01D 34/4161 |

(Continued)

FOREIGN PATENT DOCUMENTS

| | | | | |
|---|---|---|---|---|
| AU | 2014337577 A1 * | 10/2015 | ......... | A01D 34/4163 |
| DE | 4236651 C1 * | 9/1993 | ........... | A01D 34/416 |

(Continued)

OTHER PUBLICATIONS

ECHO trimmer catalogue SRM-266; Dec. 9, 2014.*

*Primary Examiner* — Laura M Lee
(74) *Attorney, Agent, or Firm* — Greenberg Traurig, LLP (57) ABSTRACT

A trimmer head includes a spool configured to rotate about a rotation axis. The spool is provided with a plurality of first transmission teeth. A head housing accommodates at least a part of the spool. The head housing is provided with a plurality of second transmission teeth for engaging with the plurality of first transmission teeth. When the trimmer head rotates about the rotation axis and along a predetermined direction, the plurality of first transmission teeth engage with the plurality of second transmission teeth to transmit force between the head housing and the spool. The force acts on a point of action of the head housing or the spool to drive the head housing and the spool to rotate synchronously along the predetermined direction.

10 Claims, 10 Drawing Sheets

(56) References Cited

U.S. PATENT DOCUMENTS

| | | | |
|---|---|---|---|
| 11,122,735 B2 * | 9/2021 | Cholst | A01D 34/4165 |
| 11,134,610 B2 * | 10/2021 | Peng | A01D 34/4166 |
| 2009/0172955 A1 * | 7/2009 | Morris | A01D 34/4163 |
| | | | 30/276 |
| 2015/0121707 A1 * | 5/2015 | Li | A01D 34/4161 |
| | | | 30/276 |
| 2015/0342116 A1 * | 12/2015 | Sprungman | A01D 34/4166 |
| | | | 30/276 |
| 2016/0324067 A1 * | 11/2016 | Skinner | A01D 34/733 |
| 2018/0098492 A1 * | 4/2018 | Guo | A01D 34/4163 |
| 2020/0008348 A1 * | 1/2020 | Guo | A01D 34/4162 |

FOREIGN PATENT DOCUMENTS

| | | | | |
|---|---|---|---|---|
| DE | 4411002 A1 * | 10/1995 | | A01D 34/4162 |
| EP | 0838144 A1 * | 8/1997 | | A01D 34/73 |
| FR | 2623364 A1 * | 5/1989 | | A01D 34/4162 |
| GB | 2170389 A * | 8/1986 | | A01D 34/4162 |
| WO | WO-2017124865 A1 * | 7/2017 | | A01D 34/006 |

* cited by examiner

TRIMMER HEAD AND STRING TRIMMER

RELATED APPLICATION INFORMATION

This application claims the benefit under 35 U.S.C. § 119(a) of Chinese Patent Application No. CN 201910877763.7, filed on Sep. 17, 2019, Chinese Patent Application No. CN 201921550134.5, filed on Sep. 17, 2019, and Chinese Patent Application No. CN 201921550166.5, filed on Sep. 17, 2019, each of which is incorporated by reference in its entirety herein.

FIELD

The present disclosure relates to a garden tool, in particular to a trimmer head and a string trimmer using the trimmer head.

BACKGROUND

As a garden tool, a string trimmer is used for trimming the grass. The string trimmer includes a motor and a trimmer head. The trimmer head rotates at a high speed to drive the trimmer line installed inside to rotate to realize a cutting function. When the motor drives the trimmer head to rotate at a high speed, the trimmer head suffers from a greater vibration, which harms the strength of the string trimmer, thereby affecting the service life of the string trimmer.

SUMMARY

In one aspect of the disclosure, a trimmer head includes: a spool configured to rotate about a rotation axis, the spool being provided with a plurality of first transmission teeth; and a head housing for accommodating at least a part of the spool, the head housing being provided with a plurality of second transmission teeth for engaging with the plurality of first transmission teeth; wherein when the trimmer head rotates about the rotation axis and along a predetermined direction, the plurality of first transmission teeth engage with the plurality of second transmission teeth to transmit force between the head housing and the spool, the force acts on a point of action of the head housing or the spool to drive the head housing and the spool to rotate synchronously along the predetermined direction; and wherein on a circle around the rotation axis and passing through the point of action, a radial direction connecting the point of action and the rotation axis is defined as a first direction, a tangent direction of the circle at the point of action is defined as a second direction, the second direction is perpendicular to the first direction, the force has a first component force along the first direction and a second component force along the second direction to drive one of the head housing and the spool to rotate with the other, and the second component force and the first component force compose the force.

In one example, each of the plurality of first transmission teeth is formed with a first contact surface, each of the plurality of second transmission teeth is formed with a second contact surface for contacting with the first contact surface, and the second component force at least partially acts on the second contact surface.

In one example, the plurality of second transmission teeth are sequentially distributed on the circle around the rotation axis, and the first contact surface extends in a plane parallel to the rotation axis.

In one example, the first contact surface extends in a plane, and the plane is arranged so as not to pass through the rotation axis.

In one example, a height of the plurality of first transmission teeth in a direction of the rotation axis is less than or equal to 5 mm.

In one example, the second contact surface extends in a plane, and the plane is arranged so as not to pass through the rotation axis.

In one example, the trimmer head further comprises a drive shaft connected to the spool, the head housing is formed with a through hole around the rotation axis through which the drive shaft can pass, and the plurality of second transmission teeth are distributed around the through hole.

In one example, a radius of a first circle of the plurality of first transmission teeth is defined as a first radius, and a radius of a second circle of the spool is defined as a second radius, the first radius is less than the second radius, and a ratio of the area of the first circle to the area of the second circle is less than or equal to 0.6.

In one example, each of the plurality of first transmission teeth comprises a first contact surface, a first arc surface and a second arc surface, the first contact surface is used to connect with the plurality of second transmission teeth, and the first contact surface connects the first arc surface and the second arc surface.

In one aspect of the disclosure, a trimmer head includes: a spool configured to rotate about a rotation axis, the spool being provided with a first transmission tooth; and a head housing for accommodating at least a part of the spool, the head housing being provided with a second transmission tooth for engaging with the first transmission tooth; wherein when the trimmer head rotates about the rotation axis and along a predetermined direction, the first transmission tooth engages with the second transmission tooth to transmit force between the head housing and the spool, the first transmission tooth comprises a first contact surface for contacting with the second transmission tooth, and the first contact surface extending in a plane that does not pass through the rotation axis.

In one example, the plane is parallel to the rotation axis.

In one example, a height of the first transmission tooth in a direction of the rotation axis is less than or equal to 5 mm.

In one example, a radius of a first circle of the first transmission tooth is defined as a first radius, and a radius of a second circle of the spool is defined as a second radius, the first radius is less than the second radius, and a ratio of the area of the first circle to the area of the second circle is less than or equal to 0.6.

In one example, each of the plurality of first transmission teeth comprises a first contact surface, a first arc surface and a second arc surface, the first contact surface is used to connect with the plurality of second transmission teeth, and the first contact surface connects the first arc surface and the second arc surface.

In one aspect of the disclosure, a string trimmer includes: a trimmer head for cutting grass; and a driving device configured to provide rotational power to the trimmer head; wherein the trimmer head includes: a spool configured to rotate about a rotation axis, the spool being provided with a plurality of first transmission teeth; and a head housing for accommodating at least a part of the spool, the head housing being provided with a plurality of second transmission teeth for engaging with the plurality of first transmission teeth; wherein when the trimmer head rotates about the rotation axis and along a predetermined direction, the plurality of first transmission teeth engage with the plurality of second transmission teeth to transmit force between the head housing and the spool, the force acts on a point of action of the head housing or the spool to drive the head housing and the spool to rotate synchronously along the predetermined direction; and wherein on a circle around the rotation axis and passing through the point of action, a radial direction connecting the point of action and the rotation axis is defined as a first direction, a tangent direction of the circle at the point of action is defined as a second direction, the second direction is perpendicular to the first direction, and the force has a first component force along the first direction and a second component force along the second direction to drive one of the head housing and the spool to rotate with the other, and the second component force and the first component force compose the force.

In one example, each of the plurality of first transmission teeth is formed with a first contact surface, each of the plurality of second transmission teeth is formed with a second contact surface for contacting with the first contact surface, and the second component force at least partially acts on the second contact surface.

In one example, the plurality of second transmission teeth are sequentially distributed on the circle around the rotation axis, and the first contact surface extends in a plane parallel to the rotation axis.

In one example, a height of the plurality of first transmission teeth in a direction of the rotation axis is less than or equal to 5 mm.

In one example, a radius of a first circle of the plurality of first transmission teeth is defined as a first radius, and a radius of a second circle of the spool is defined as a second radius, the first radius is less than the second radius, and a ratio of the area of the first circle to the area of the second circle is less than or equal to 0.6.

In one example, each of the plurality of first transmission teeth comprises a first contact surface, a first arc surface and a second arc surface, the first contact surface is used to connect with the plurality of second transmission teeth, and the first contact surface connects the first arc surface and the second arc surface.

DESCRIPTION

The following is a detailed description with reference to the drawings and specific examples.

Figure 1:
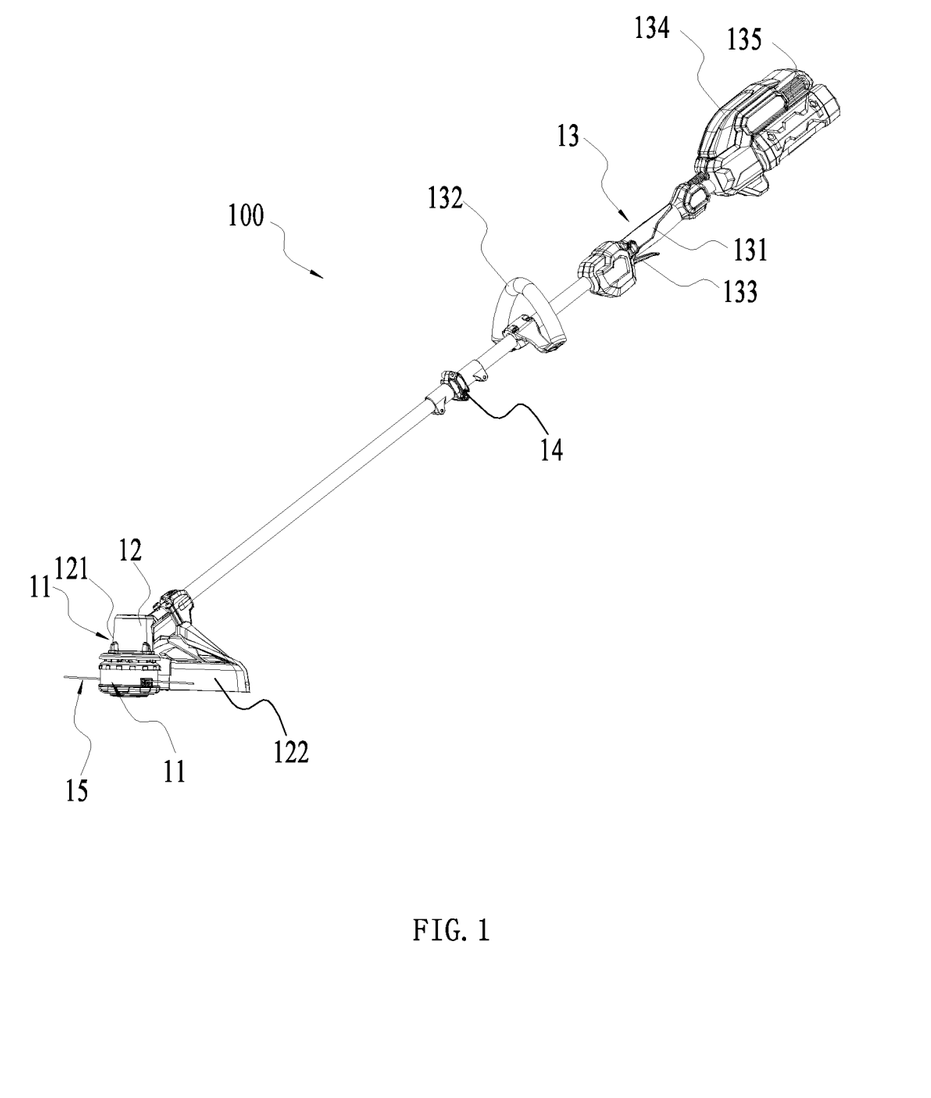
FIG. 1 is a perspective view of a string trimmer according to an example.

The string trimmer 100 shown in FIG. 1 includes a trimmer head 11, a driving device 12, an operating device 13 and a connecting device 14. The trimmer head 11 is configured to install a trimmer line 15 to realize a cutting function. The driving device 12 is configured to provide rotational power to the trimmer head 11, and the driving device 12 includes a motor (not shown) and a first housing 121. The motor is arranged in the first housing 121, and the motor drives the trimmer head 11 to rotate about a rotation axis 101. The operating device 13 includes a handle 131, an auxiliary handle 132, a main switch 133, and a second housing 134. The handle 131 and the auxiliary handle 132 are respectively used for the user's hands to hold, so that the string trimmer 100 can be operated more stably. The main switch 133 may be arranged on the handle 131, and the user can directly operate the main switch 133 to control the string trimmer 100 to cut grass when holding the handle 131. The second housing 134 is provided with a coupling portion 135 that couples to the power supply device. For example, the coupling portion 135 may couple to a battery pack to power the string trimmer 100. In this example, the handle 131 and the second housing 134 are formed separately. It can be understood that, in some other examples, the handle may also be integrally formed with the second housing. The connecting device 14 includes a connecting rod for connecting the first housing 121 and the second housing 134. The auxiliary handle 132 is also mounted to the connecting rod, and the auxiliary handle 132 may be located between the first housing 121 and the second housing 134. The string trimmer 100 may further include a shield 122, which is at least partially distributed around the string trimmer 11 to prevent grass clippings from flying to the user's operating direction when the string trimmer 11 is cutting grass.

Figure 2:
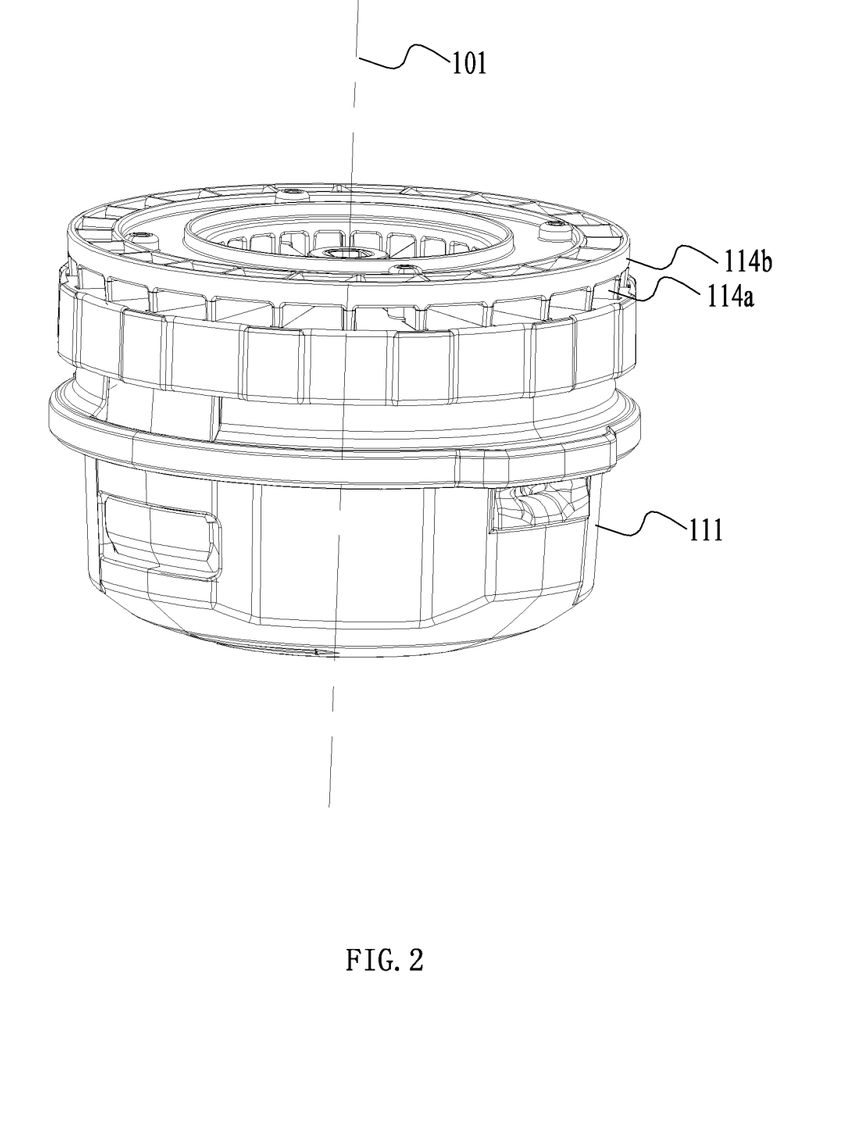
FIG. 2 is a perspective view of a trimmer head of the string trimmer in FIG. 1.
Figure 3:
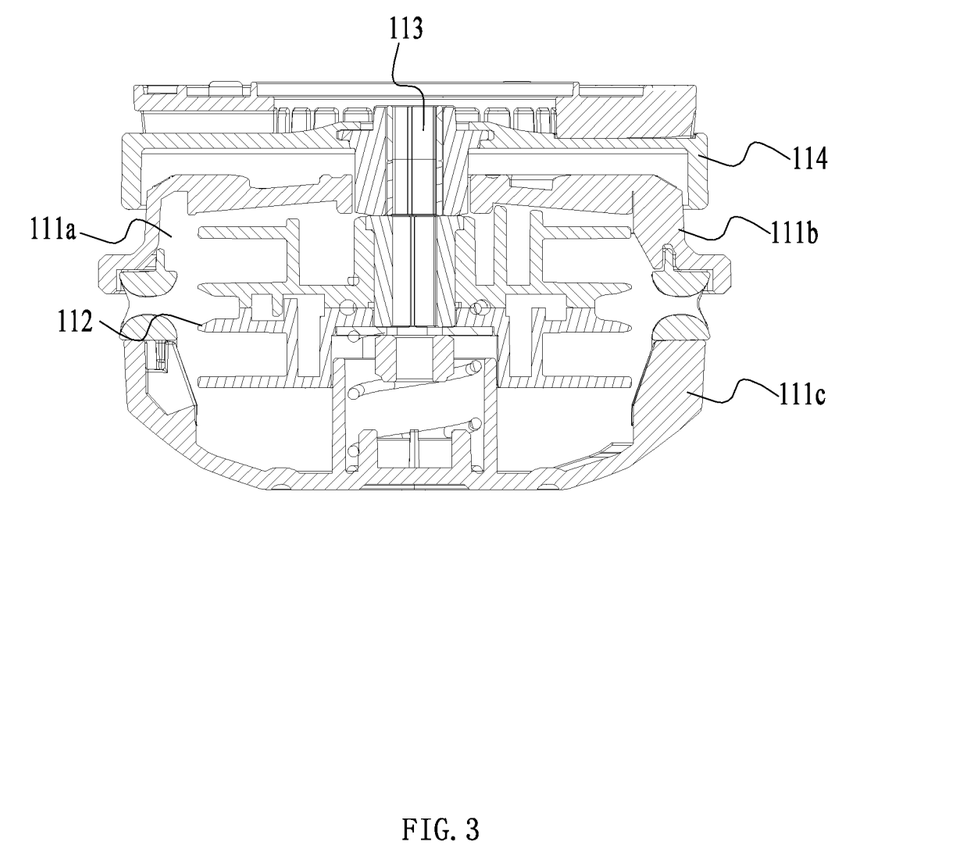
FIG. 3 is a cross-sectional view of the trimmer head in FIG. 2.

As shown in FIGS. 2 and 3, the trimmer head 11 further includes a head housing 111, a spool 112, a driving shaft 113 and a first accessory 114. The head housing 111 is formed with an accommodation space 111a around the rotation axis 101 capable of accommodating at least a part of the spool 112. One side of the head housing 111 forming the accommodation space 111a is the interior of the head housing 111, and the other side of the head housing 111 opposite to the interior is the exterior. The first accessory 114 is mounted on the head housing 111 and can rotate synchronously with the head housing 111. Optionally, the first accessory 114 may be fixedly connected to the head housing 111 or integrally formed. The first accessory 114 is connected or formed with a fan 114a and an anti-wrap cover 114b. The fan 114a is used to cool the motor, and the anti-wrap cover 114b is used to prevent grass clippings from entering the trimmer head 11, thereby preventing the trimmer head 11 from failing.

Figure 4:
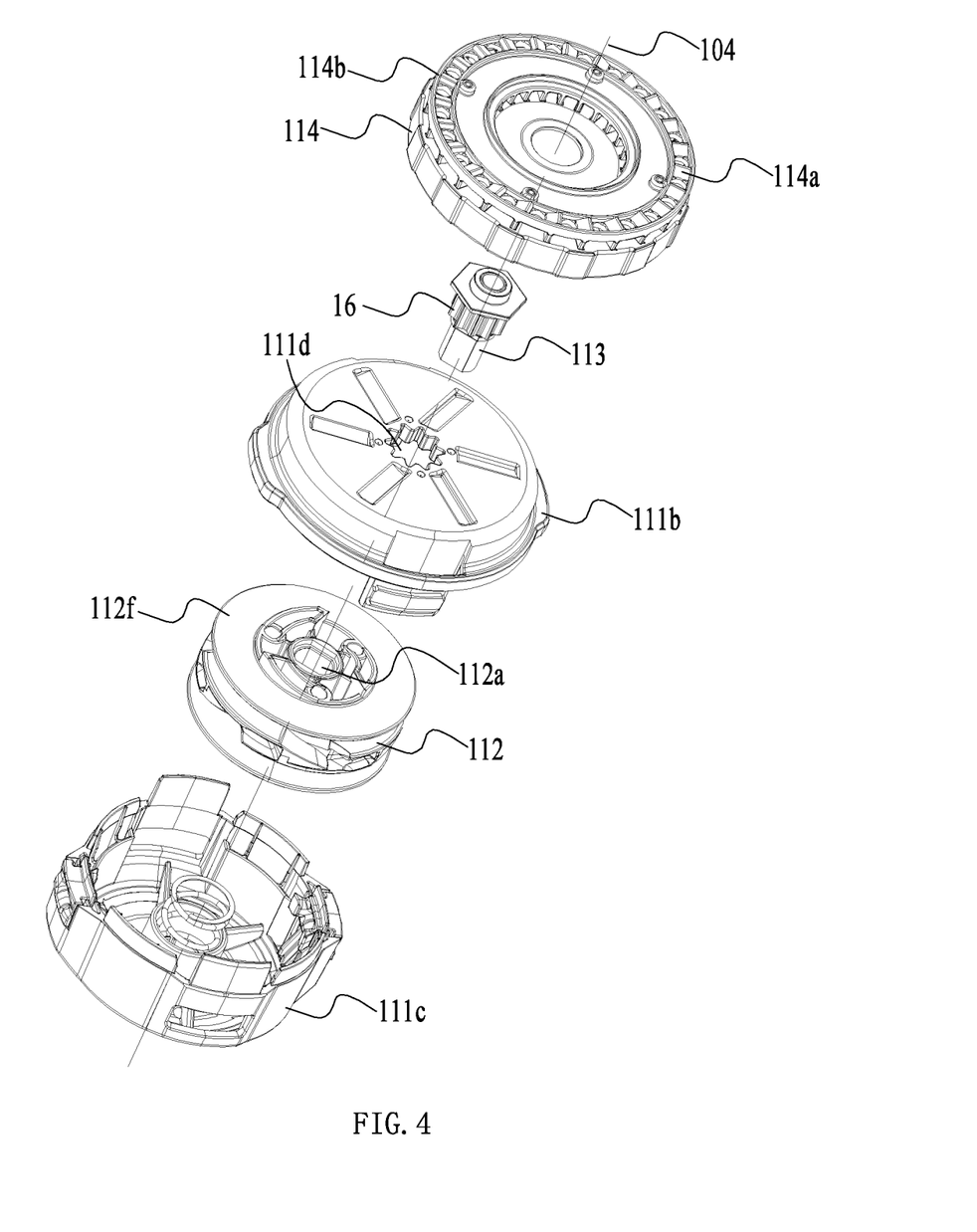
FIG. 4 is an exploded view of a first type connector installed on the trimmer head in FIG. 2.
Figure 5:
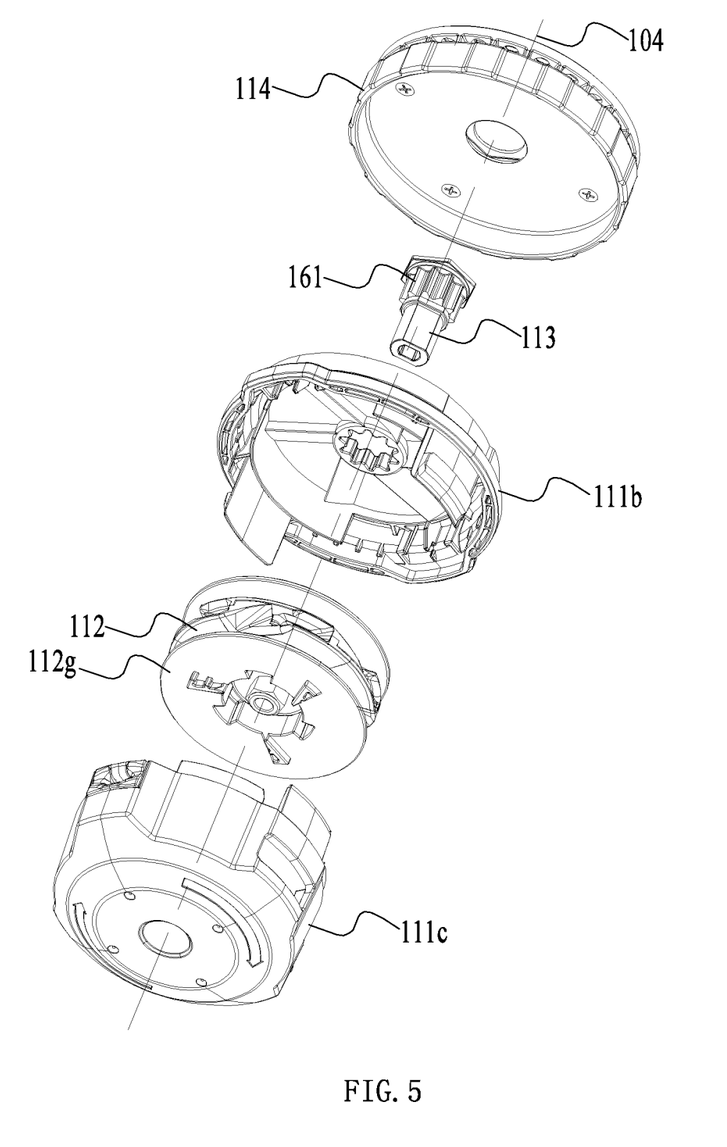
FIG. 5 is an exploded view of the first type connector installed on the trimmer head in FIG. 4 from another perspective.

As shown in FIGS. 3-5, the head housing 111 includes a first shell part 111b and a second shell part 111c. The first shell part 111b and the second shell part 111c are connected by a snap to form a whole. Optionally, the first shell part 111b and the second shell part 111c may also be connected by other methods such as bonding, screw connection, etc., which will not be discussed here. As a specific example, the first shell part 111b is formed with a through hole 111d through which the drive shaft 113 can pass. One end of the drive shaft 113 is connected to a motor shaft (not shown), while the other end passes through the through hole 111d and forms a flat to be connected with the spool 112. The spool 112 is formed with a connecting hole 112a that fits the flat of the drive shaft 113. The drive shaft 113 and the spool 112 are connected as a whole by interference fit and can rotate synchronously under the drive of the motor. In some other examples, the drive shaft and the spool may also be connected by other connection methods. The spool is formed with a screw hole and a locking piece, and the drive shaft is formed with an external thread that mates the screw hole to form a threaded connection and is locked by the locking piece so as not to screw out.

In this example, the string trimmer 100 includes a trimming mode and a winding mode. When the string trimmer 100 is in the trimming mode, the motor drives the spool 112 to rotate along a first rotation direction 102, the spool 112 drives the head housing 111 to rotate synchronously and drives the trimmer line 15 to rotate at a high speed to trim grass. When the string trimmer 100 is in the winding mode, the spool 112 rotates along a second rotation direction 103, and the spool 112 and the head housing 111 rotate relative to each other. At this time, the trimmer line 15 can be wound onto the spool 112. The winding mode further includes two modes: automatic winding mode and manual winding mode. When the mower 100 is in the automatic winding mode, the motor drives the spool 112 to rotate along the second rotation direction 103, and the spool 112 and the head housing 111 rotate relative to each other, so that the trimmer line 15 can be wound onto the spool 112. When the string trimmer 100 is in the manual winding mode, the user holds the first accessory 114 with one hand and manually rotates the head housing 111 with the other hand, such that the head housing 111 and the spool 112 rotate relative to each other. At this time, the trimmer line 15 can be wound onto the spool 112.

Figure 7:
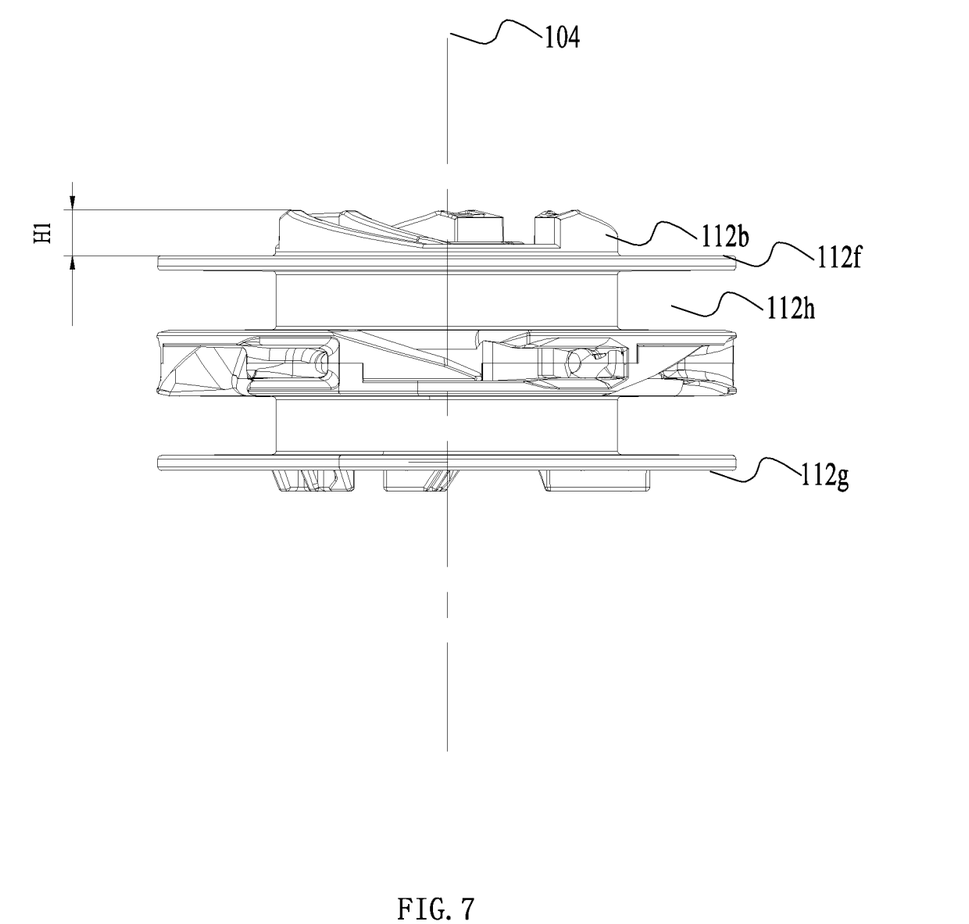
FIG. 7 is a front view of a spool of the trimmer head in FIG. 2.
Figure 8:
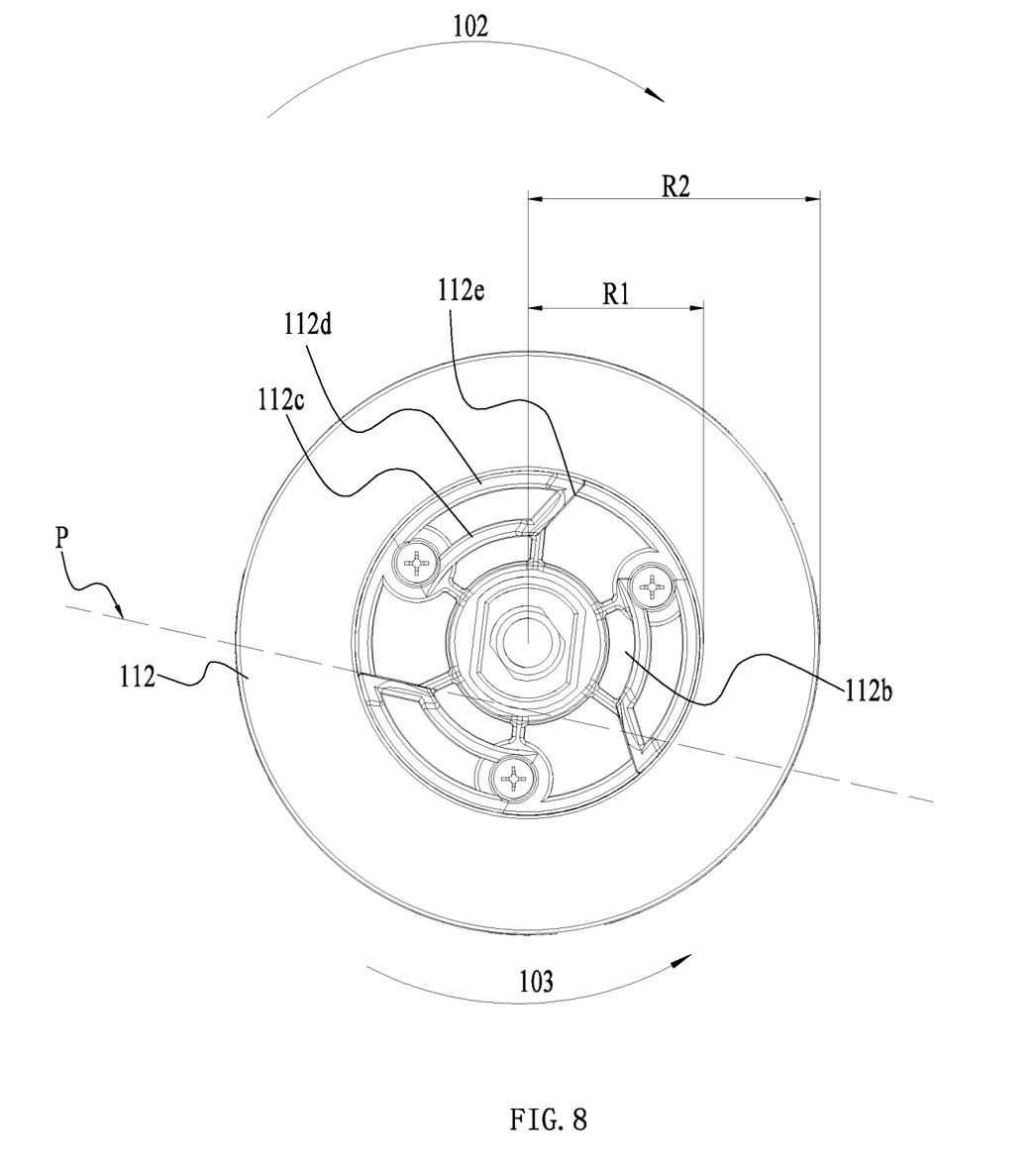
FIG. 8 is a top view of the spool of the trimmer head in FIG. 7.

As shown in FIGS. 7 and 8, in the direction of a first straight line 104 parallel to the rotation axis 101, the spool 112 is a cylinder formed around the first straight line 104 and the connecting hole 112*a* for mating with the flat of the drive shaft 113 is distributed along the first straight line 104; the connecting hole 112*a* penetrate the spool 112 itself, and a first transmission part for transmission is also formed around the connecting hole 112*a*. The spool 112 further includes a first flange 112*f* and a second flange 112*g*. Between the first flange 112*f* and the second flange 112*g*, a slot 112*h* for receiving the trimmer line 15 is formed.

A second transmission part that engages with the first transmission part is also formed on the head housing 111. The first transmission part transmits motor power to the second transmission part, so as to drive the head housing 111 to rotate synchronously. Specifically, the first transmission part is a plurality of first transmission teeth 112*b* evenly distributed around the rotation axis 101, and the second transmission part is a plurality of second transmission teeth 111*h* distributed around the first straight line 104. When the motor drives the trimmer head 11 to rotate at a high speed, there will be vibrations between the spool 112 and the head housing 111 caused by issues like gaps or counterweights raised from assembly or production process. The imbalance under high-speed rotation will cause a large eccentric force F0 between the head housing 111 and the spool 112. In this example, each of the second transmission teeth 111*h* is biased toward the second rotation direction 103 to a predetermined angle. In this way, during the high-speed rotation of the head housing 111 along with the spool 112, the second transmission teeth 111*h* will generate a reaction force on the first transmission teeth 112*b* that deviates from the above-mentioned eccentric force F0, thereby offsetting the eccentric force F0 between the head housing 111 and the spool 112 generated from assembly or technological barriers, reducing or even cancelling the interaction force between the head housing 111 and the spool 112, thereby effectively reducing the vibration between the head housing 111 and the spool 112, and lowering the strength requirements for the various parts of the trimmer head 11.

Each of the first transmission teeth 112*b* includes a first arc surface 112*c* and a second arc surface 112*d* distributed around the rotation axis 101. The first arc surface 112*c* and the second arc surface 112*d* are connected through a first contact surface 112*e*. On a connecting surface that connects the rotation axis 101 and the joint of the first arc surface 112*c* and the first contact surface 112*e*, the second arc surface 112*d* is located at both ends of the connecting surface. The first contact surface 112*e* of the first transmission teeth 112*b* is distributed toward the first rotation direction 102. The included angle between the tangent at the joint between the first arc surface 112*c* and the first contact surface 112*e* and the straight line passing the tangent on the first contact surface 112*e* is an acute angle, and the included angle faces the first rotation direction 102. In order to increase the transmission force between the spool 112 and the head housing 111, the first transmission teeth 112*b* are distributed in a predetermined circumferential range. Here, a radius of a first circle of the first transmission teeth 112*b* is defined as a first radius R1, and a radius of a second circle of the spool 112 is defined as a second R2. The first radius R1 is less than the second radius R2, and the ratio of the area of the first circle to the area of the second circle is less than or equal to 0.6, that is, the ratio of the area of the circle formed by the line between the farthest point of the first transmission teeth from the rotation axis and the rotation axis to the area of the circle formed by the spool around the rotation axis is less than or equal to 0.6. Along the direction of the first straight line 104, the first transmission teeth 112*b* also protrude from the first flange 112*f* where the body of the spool 112 is located and have a certain height. Along the first straight line 104, the vertical distance H1 between the highest point of the first transmission teeth 112*b* and the first flange 112*f* is less than or equal to 5 mm. With this arrangement, on the one hand, the radial space occupied by the first transmission teeth 112*b* is reduced, and the convenience of assembly is increased; on the other hand, the transmission force between the first transmission teeth 112*b* and the second transmission teeth 111*h* is increased, so that the first transmission teeth 112*b* and the second transmission teeth 111*h* are engaged more easily. In this example, the spool 112 consists of a first spool part 112 and a second spool part 112, and the first spool part 112 and the second spool part 112 are connected by a fixing member. The first spool part 112 is formed with a fixing hole (not shown) for connecting the second spool part 112, and the fixing hole is provided on the first transmission teeth 112*b*.

Figure 9:
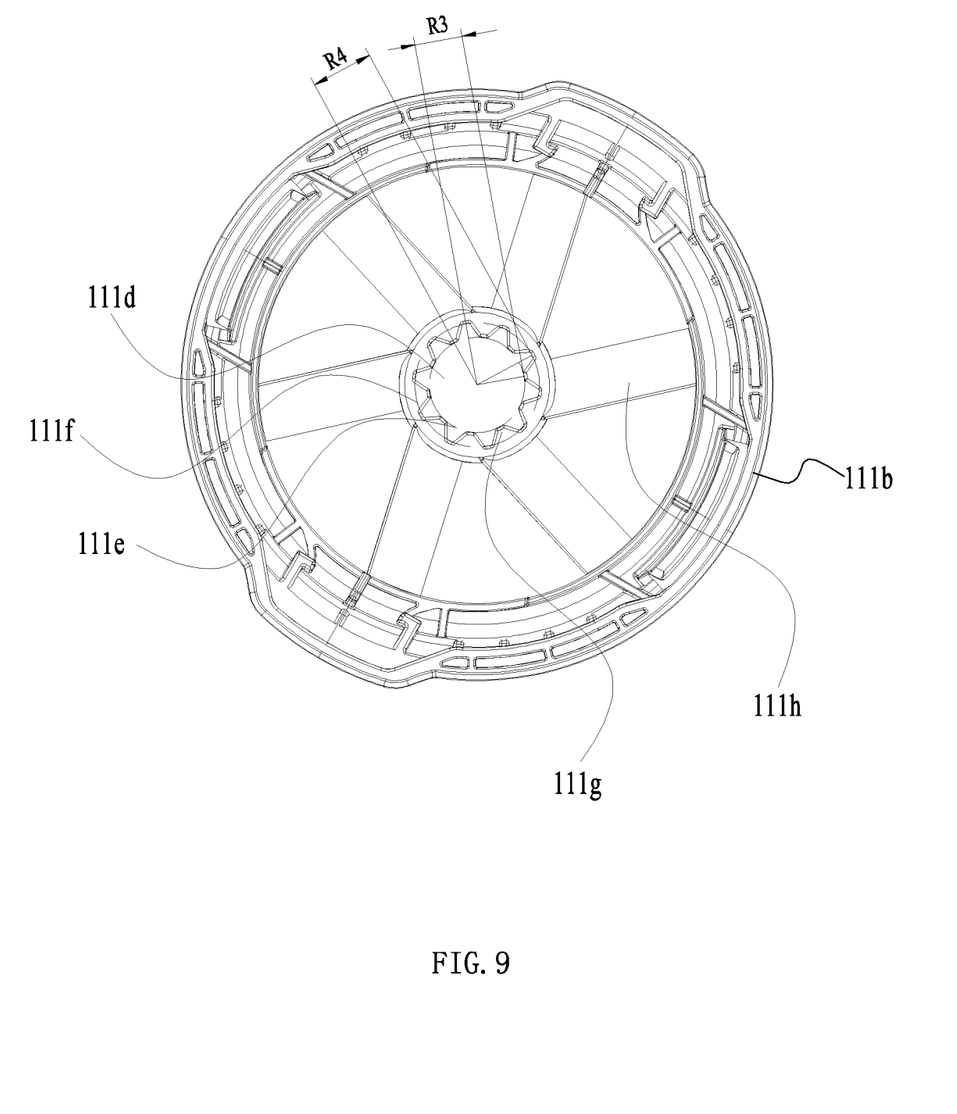
FIG. 9 is a bottom view of the first shell part of the trimmer head in FIG. 2.
Figure 10:
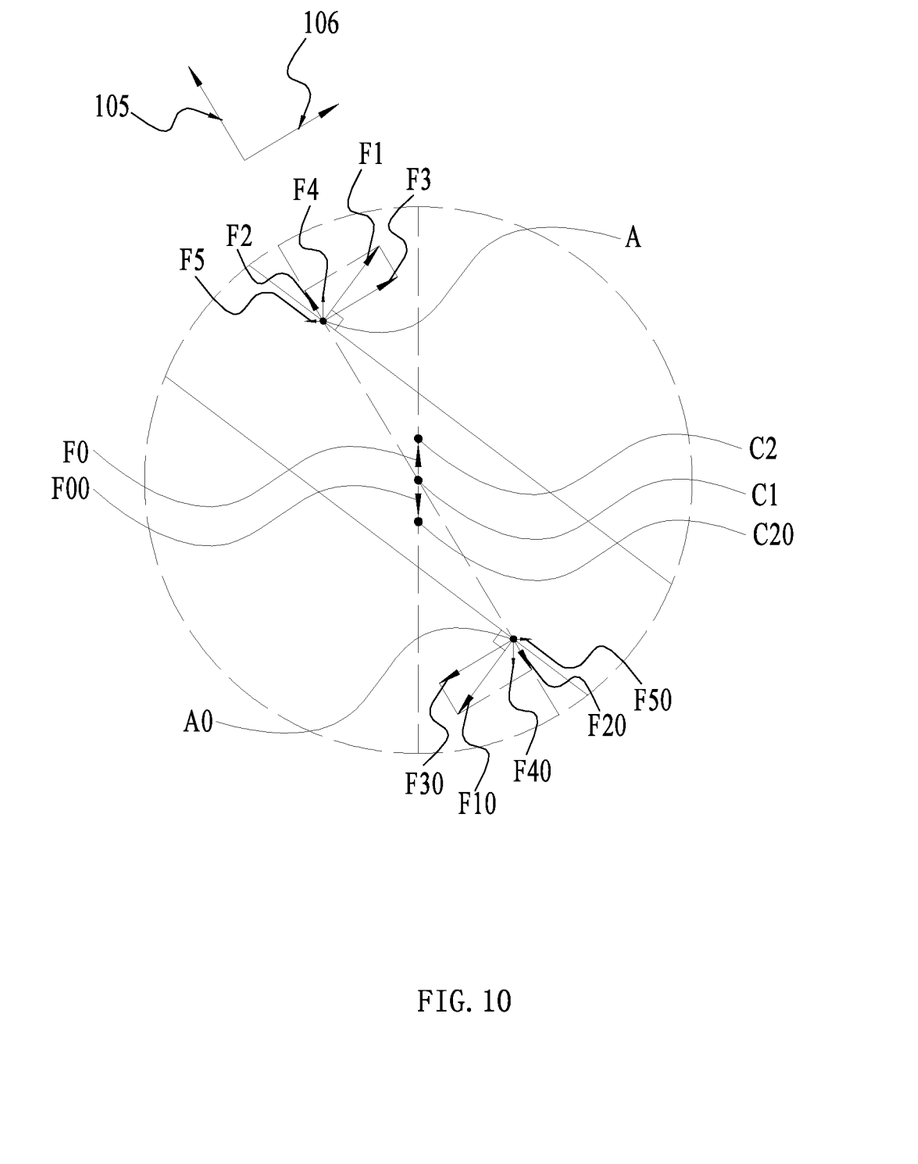
FIG. 10 is a force analysis diagram at any point A on the second transmission teeth of the first shell part of the trimmer head in FIG. 9.

As shown in FIGS. 8-10, as a preferred example, the number of first transmission teeth 112*b* is a submultiple of the number of second transmission teeth 111*h*. In this way, when the first transmission teeth 112*b* and the second transmission teeth 111*h* need to be engaged, they can engage at any position, and when one of the first transmission teeth 112*b* is engaged with one of the second transmission teeth 111*h*, the remaining first transmission teeth 112*b* are also respectively engaged with the remaining second transmission teeth 111*h* at the same time. As shown in FIG. 9, in an example, three first transmission teeth 112*b* are provided, and six second transmission teeth 111*h* are provided. The second transmission teeth 111*h* are distributed on the first shell part 111*b*. Along the circumferential direction around the through hole 111*d* of the first shell part 111*b*, the second transmission teeth 111*h* are evenly distributed. In the second line direction where the center of any through hole 111*d* passing through the first shell part 111b is located, each of the second transmission teeth 111h is formed with a second contact surface 111k that is engaged with the first contact surface 112e. The extension direction of the second contact surface 111k deviates from the second straight direction. In fact, it is understood that, one end of the drive shaft 113 is connected to the motor shaft, and the other end is connected to the spool 112 through the through hole 111d. When the motor drives the spool 112 to rotate with the drive shaft 113, the spool 112 drives the head housing 111 to rotate synchronously by the engagement of the first transmission teeth 112b and the second transmission teeth 111h of the head housing 111. Due to technical limitations in craft or assembly, neither the spool 112 nor the head housing 111 is a perfect circle. Therefore, driven by the motor, both the head housing 111 and the spool 112 generate a centrifugal force perpendicular to the direction of the rotation axis 101. In fact, the spool 112 is directly driven by the motor; the spool 12 has a first circle center C1 and can rotate about the first circle center C1. A certain gap exists between the head housing 111 and the drive shaft 113, and the gap is not even, causing the head housing 111, when driven by the spool 112, to rotate about a second circle center C2. Within a certain error range, the first circle center C1 and the second circle center C2 do not coincide, therefore, under the same rotational speed, the centrifugal force acting on the head housing 111 and the centrifugal force acting on the spool 112 are not the same, resulting in the generation of the eccentric force F0. The eccentric force F0 causes a certain displacement between the head housing 111 and the spool 112. When the eccentric force F0 exists at all angles around the circumferential direction, a relatively violent vibration will be generated between the head housing 111 and the spool 112. Since the spool 112 and the head housing 111 are only engaged by the first transmission teeth 112b and the second transmission teeth 111h to transmit the force, the above-mentioned vibration will increase the force between the first transmission teeth 112b and the second transmission teeth 111h, thereby affecting the stability of the structure of the trimmer head 11 itself, and also affecting the service life of the trimmer head 11.

Specifically, as shown in FIG. 10, take any point A on the second transmission teeth 111h for force analysis. When the first transmission teeth 112b engage with the second transmission teeth 111h, the first contact surface 112e of the first transmission teeth 112b is in contact with the second contact surface 111k of the second transmission teeth 111h to make the head housing and the spool rotate synchronously. The first contact surface 112e extends in a plane P parallel to the rotation axis 101, the plane P is arranged so as not to pass through the rotation axis 101, and the second contact surface 111k also extends in a plane that does not pass through the rotation axis 101. When the trimmer head 11 rotates at a high speed, due to the torque, a force F1 that is perpendicular to both the first contact surface 112e and the second contact surface 111k is generated between the head housing 111 and the spool 112, and the force F1 acts on a point of action A of the head housing 111 or the spool 112. A radial direction connecting the point of action A and the rotation axis 101 is defined as a first direction 105, a tangent direction of a circle around the rotation axis 101 at the point of action A is defined as a second direction 106, the second direction 106 is perpendicular to the first direction 105, the force F1 can be decomposed into two mutually perpendicular component forces. The two component forces include a first component force F2 along the first direction 105 and a second component force F3 along the second direction 106. Wherein, the first component force F2 extends in the direction of the first circle center C1 and can pass through the first circle center C1; the second component force F3 is distributed along a direction that intersects the engaging surfaces of the first transmission teeth 112b and the second transmission teeth 111h simultaneously and drives one of the head housing and the spool to rotate with the other. It can be understood that when the second transmission teeth 111h are not biased toward the second rotation direction 103, the above-mentioned force F1 does not have component forces; instead it all acts on a direction that is perpendicular to the engaging surfaces of the first transmission teeth 112b and the second transmission teeth 111h simultaneously, which imposes stricter requirements on the first transmission teeth 112b and the transmission teeth themselves. Here, making the second transmission teeth 111h to be biased toward the second rotation direction 103 effectively reduces the force directly acting in the direction perpendicular to both the engaging surfaces of the first transmission teeth 112b and the second transmission teeth 111h, thereby loosening the requirements on the structural strength of the first transmission teeth 112b and the second transmission teeth 111h are reduced. In fact, the first component force F2 can be further decomposed into two mutually perpendicular component forces. The two component forces include a third component force F4 and a fourth component force F5. Among them, the third component force F4 has a similar magnitude as the aforementioned eccentric force F0, but in opposite direction. At a suitable angle, the third component force F4 has the same magnitude as the eccentric force F0, but in opposite direction, and theoretically they can offset completely, thereby effectively solving the vibration problem between the head housing 111 and the spool 112 due to the eccentric force F0. In fact, in a straight line direction passing through the first circle center C1, the second transmission teeth 111h include a set of component forces of the same magnitude and opposite directions: the first component force F2 and a first component force F20. While the first component force F2 offsets the eccentric force F00 and the first component force F20 offsets the eccentric force F0, the first component force F2 and the first component force F20 can also restrain each other to prevent the head housing 11 from shaking relative to the spool 12, so that the resultant force between the head housing 11 and the spool 12 is toward the first circle center C1. In an optional example, in order to achieve better engagement between the first transmission teeth 112b and the second transmission teeth 111h, each of the first transmission teeth 112b may be configured to be biased toward the first rotation direction 102 to a predetermined angle. Therefore, when the first transmission teeth 112b are mated with the second transmission teeth 111h, the first contact surfaces 112e of the first transmission teeth 112b and the second contact surfaces 111k of the second transmission teeth 111h can effectively fit, thereby making the force between the two first contact surfaces 112e more even.

It can be understood that by biasing the second transmission teeth 111h to the second rotation direction 103 to a predetermined angle, the problem of vibration between the head housing 111 and the spool 112 is effectively solved, thereby loosening the requirements of the material of the head housing 111 to form the second transmission teeth 111h. In fact, under the above arrangement, the head housing 111 used to form the second transmission teeth 111h can be made thinner in the direction of the rotation axis 101. The height of the second transmission teeth 111h in the direction of the rotation axis 101 is less than or equal to 5 mm, which saves the material to make the second transmission teeth 111*h* and makes the engagement and detachment between the second transmission teeth 111*h* and the first transmission teeth 112*b* more convenient.

Figure 6:
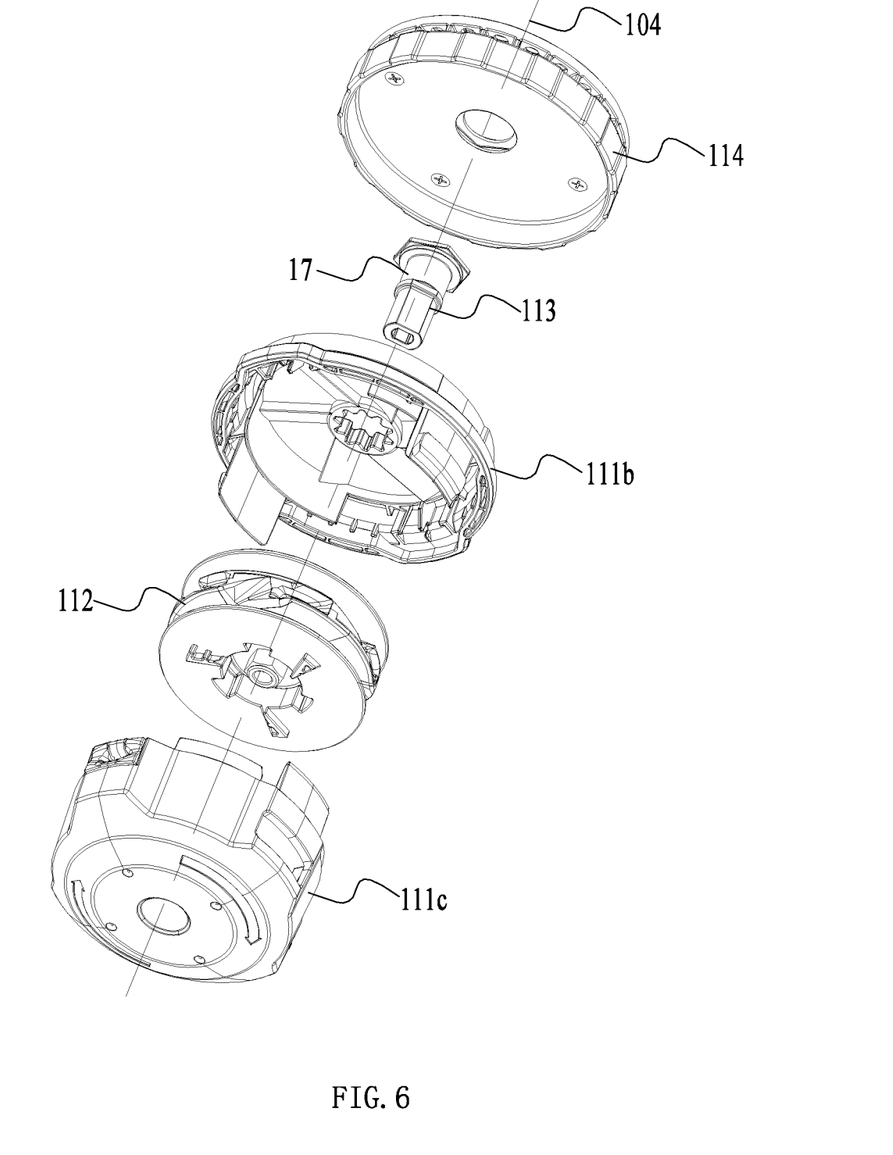
FIG. 6 is an exploded view of a second type connector installed on the trimmer head in FIG. 2.

As shown in FIGS. 5-6, in this example, the string trimmer 100 also has a first use state and a second use state that are switchable. In order to facilitate the switching of the use state, a first type connector 16 or a second type connector 17 is also connected to or formed on the driving shaft 113. Specifically, when the first type connector 16 is connected to the drive shaft 113, the string trimmer 100 is in the first use state; when the second type connector 17 is connected to the drive shaft 113, the string trimmer 100 is in the second use state. In an example, the first use state is the state when the string trimmer 100 is in the automatic winding mode; the second use state is the state when the string trimmer 100 is in the manual winding mode. In order to toggle between the automatic winding mode and the manual winding mode of the string trimmer 100, the head housing 111 is configured for the string trimmer 11 to suit different operation modes. In an optional example, the through hole 111*d* of the head housing 111 is configured to be switchable between two operating modes. When the string trimmer 100 is in the automatic winding mode, the drive shaft 113 in the through hole 111*d* is provided with the first type connector 16, and the first type connector 16 is movably connected to the drive shaft 113 and can rotate relative to the drive shaft 113. When the string trimmer 100 is in the manual winding mode, the drive shaft 113 in the through hole 111*d* is provided with the second type connector 17, and the second type connector 17 is fixedly connected to the drive shaft 113 and can rotate synchronously. Specifically, the through hole 111*d* is formed with a first circumferential surface 111*e* and a second circumferential surface 111*f* around the rotation axis 101. The radius R3 of the first circumferential surface 111*e* is less than the radius R4 of the second circumferential surface 111*f*. An inner transmission part 111*g* for transmission is formed between the first circumferential surface 111*e* and the second circumferential surface 111*f* In fact, regardless of whether the drive shaft 113 is installed with the first type connector 16 or the second type connector 17, the through hole 111*d* of the head housing 111 can pass through. In fact, the ratio of the area of the first circumferential surface 111*e* of the through hole 111*d* to the area of the circle of the head housing 111 around the rotation axis 101 is greater than or equal to 0.4. This kind of setting, on the one hand, realizes the effective engagement between the through hole 111*d* and the drive shaft 113 and reduces the vibration between the head housing 111 and the spool 112, and on the other hand, reduces the space for forming the through hole 111*d*, thereby increasing the structural strength of the head housing 111, and avoiding harm on the strength of the head housing 111 from an excessively large through hole 111*d*. In fact, this size and ratio setting effectively saves the material used to make the head housing 111 and reduces the thickness of the head housing 111, thereby reducing the load of the motor and increasing the battery life and operation convenience of the string trimmer 100. It is understood that, with respect to the string trimmer 100, a user needs to hold the handle 131 provided on the connecting rod for a long time to trim grass. The lighter the weight of the trimmer head 11, the lighter the weight of the load on the user's hand, the more comfortable the user operation will be. In addition, since the circle of the through hole 111*d* is small, the part left for the head housing 111 to form the second transmission teeth 111*h* is relatively large, so that the first contact surface 112*e* of the second transmission teeth 111*h* is longer in the radial direction of the head housing 111. In this way, the first transmission teeth 112*b* and the second transmission teeth 111*h* could be engaged more reliably. In fact, in this example, the ratio of the length of the first contact surface 112*e* of the second transmission teeth 111*h* in the radial direction to the radius of the circle of the first circumferential surface 111*e* of the through hole 111*d* is greater than one.

In an optional example, the inner transmission part 111*g* may be in the form of transmission teeth. Here, the first type connector 16 is connected to or formed with an outer transmission part 161 that engages with the inner transmission part 111*g*. When the inner transmission part 111*g* and the outer transmission part 161 engage, the drive shaft 113 drives the head housing 111 to rotate synchronously. The second type connector 17 is a round ring having a smooth surface, which is mounted on the drive shaft 113 and passes through the through hole 111*d*. The second type connector 17 does not generate interaction force with the inner transmission part 111*g* and does not drive the head housing 111 to rotate. In fact, when the drive shaft 113 is mounted with the second type connector 17 and passes through the through hole 111*d*, the second type connector 17 does not contact the inner transmission part 111*g*; or, the inner transmission part 111*g* and the second type connector 17 partially contact, but do not generate interaction force.

More specifically, after the drive shaft 113 is connected to the first type connector 16 or the second type connector 17, the first type connector 16 or the second type connector 17 forms a fixed connection with the first accessory 114. In fact, the first accessory 114 and the drive shaft 113 always form a synchronous rotation. In some alternative examples, the first accessory 114 is fixedly connected to the drive shaft 113 through the first type connector 16 or the second type connector 17. Alternatively, the first accessory 114 directly forms a fixed connection with the drive shaft 113 and rotates synchronously with the drive shaft 113.

When the string trimmer 100 is set to the automatic winding mode, the driving shaft 113 is connected to the first type connector 16, and the head housing 111 can rotate synchronously with the driving shaft 113 at this time. Whenever winding is required, the user controls the operating device 13 to make the motor rotate reversely. At this time, the drive shaft 113 drives the spool 112 to rotate along the second rotation direction 103. With the reverse rotation, the first transmission teeth 112*b* step over the second transmission teeth 111*h*, and the two are no longer engaged. Also, because the head housing 111 and the first accessory 114 form a synchronous rotation through the first type connector 16, when the user activates the automatic winding switch, the string trimmer 100 is provided with a locking pin for locking the rotation of the head housing 111 or the spool 112. In this example, the locking pin is used to lock the head housing 111. When the locking pin is inserted into the through hole 111*d* of the first accessory 114 along the rotation axis 101, the rotation of the first accessory 114 and the head housing 111 is locked. At this time, the drive shaft 113 can freely rotate relative to the first type connector 16, thereby driving the spool 112 to rotate, generating relative rotation between the spool 112 and the head housing 111, so that the trimmer line 15 can be wound onto the slot 112*h* of the spool 112.

When the string trimmer 100 is set to the manual winding mode, the drive shaft 113 is connected to the second type connector 17; at this time, the head housing 111 can rotate freely relative to the first accessory 114. Whenever winding is required, the user can hold the first accessory 114 with one hand and the head housing 111 with the other hand to rotate along the second rotation direction 103. At this time, relative rotation occurs between the head housing 111 and the spool 112, so that the trimmer line 15 can be wound onto the slot 112h of the spool 112.

The above shows and describes the basic principles, main features and advantages of the subject trimmer head and string trimmer. Those skilled in the art should understand that the above-mentioned examples do not limit the present invention in any form, and all technical solutions obtained by equivalent replacement or equivalent transformation fall within the protection scope of the invention as hereinafter claimed.

What is claimed is:

1. A trimmer head, comprising:
   a spool defining a central connecting hole configured to accept a drive shaft that is rotatable about a rotation axis, the spool being manufactured with an imbalance about the rotation axis and provided with a plurality of first transmission teeth; and
   a head housing for accommodating at least a part of the spool, the head housing being provided with a plurality of second transmission teeth for engaging with the plurality of first transmission teeth,
   wherein, when the trimmer head rotates about the rotation axis and along a predetermined direction, the plurality of first transmission teeth engage with the plurality of second transmission teeth to transmit a force (F1) between the head housing and the spool, each of the plurality of first transmission teeth is formed with a first contact surface, each of the plurality of second transmission teeth is formed with a second contact surface for contacting with the first contact surface, the force (F1) acting on a point of action of the first contact surface or the second contact surface to drive the head housing and the spool to rotate synchronously along the predetermined direction, the force (F1) is perpendicular to the first contact surface, in a circle around the rotation axis and passing through the point of action, a radial direction connecting the point of action and the rotation axis is defined as a first direction, a tangent direction of the circle at the point of action is defined as a second direction, the second direction is perpendicular to the first direction, and
   wherein a plane of the first contact surface does not pass through the central connecting hole such that the force (F1) perpendicular to the first contact surface is not perpendicular to the first direction, the force (F1) has a first component force (F2) along the first direction and a second component force (F3) along the second direction to drive one of the head housing and the spool to rotate with the other, and the first component force (F2) is at least capable of offsetting an eccentric force (F0) between the head housing and the spool generated as a product of the imbalance and rotation of the spool.

2. The trimmer head of claim 1, wherein the plurality of second transmission teeth are sequentially distributed on the circle around the rotation axis and the first contact surface extends in a plane parallel to the rotation axis.

3. The trimmer head of claim 1, wherein the first contact surface extends in a plane and the plane is arranged so as not to pass through the rotation axis.

4. The trimmer head of claim 1, wherein the second contact surface extends in a plane and the plane is arranged so as not to pass through the rotation axis.

5. The trimmer head of claim 1, wherein the trimmer head further comprises a drive shaft connected to the spool, the head housing is formed with a through hole around the rotation axis through which the drive shaft can pass, and the plurality of second transmission teeth are distributed around the through hole.

6. The trimmer head of claim 1, wherein each of the plurality of first transmission teeth further comprises a first arc surface and a second arc surface, the first contact surface is used to connect with the plurality of second transmission teeth, and the first contact surface connects the first arc surface and the second arc surface.

7. The trimmer head of claim 1,
   wherein a height of the first transmission teeth in a direction of the rotation axis is less than or equal to 5 mm.

8. The trimmer head of claim 6, wherein each of the second arc surfaces of the first transmission teeth are radially located away from an outermost edge of the spool, and a radius of a first circle of the first transmission teeth is defined as a first radius, a radius of a second circle of the spool is defined as a second radius, the first radius is less than the second radius, and a ratio of an area of the first circle to an area of the second circle is less than or equal to 0.6.

9. The trimmer head of claim 7, wherein each of the first transmission teeth further comprises a first arc surface and a second arc surface, the first contact surface is used to connect with a corresponding one of the plurality of second transmission teeth, and the first contact surface connects the first arc surface and the second arc surface.

10. A trimmer head, comprising:
    a spool configured to rotate about a rotation axis, the spool being manufactured with an imbalance about the rotation axis and provided with a plurality of first transmission teeth; and
    a head housing for accommodating at least a part of the spool, the head housing being provided with a plurality of second transmission teeth for engaging with the plurality of first transmission teeth,
    wherein, when the trimmer head rotates about the rotation axis and along a predetermined direction, the plurality of first transmission teeth engage with the plurality of second transmission teeth to transmit a force (F1) between the head housing and the spool, each of the plurality of first transmission teeth is formed with a first contact surface, each of the plurality of second transmission teeth is formed with a second contact surface for contacting with the first contact surface, the force (F1) acting on a point of action of the first contact surface or the second contact surface to drive the head housing and the spool to rotate synchronously along the predetermined direction, the force (F1) is perpendicular to the first contact surface, in a circle around the rotation axis and passing through the point of action, a radial direction connecting the point of action and the rotation axis is defined as a first direction, a tangent direction of the circle at the point of action is defined as a second direction, the second direction is perpendicular to the first direction;
    wherein the first contact surface does not pass through a first circle center C1 of the spool such that the force (F1) perpendicular to the first contact surface is not perpendicular to the first direction, the force (F1) has a first component force (F2) along the first direction and a second component force (F3) along the second direction to drive one of the head housing and the spool to rotate with the other, and the first component force (F2) is at least capable of offsetting an eccentric force (F0) between the head housing and the spool generated as a product of the imbalance and rotation of the spool; and wherein the spool is formed with a connecting hole that fits a drive shaft, the first contact surface extends in a plane P parallel to the rotation axis, and the plane P is arranged so as not to pass through the connecting hole.

\* \* \* \* \*